May 24, 1960 G. STEVENS 2,937,748
HAULM REMOVING DEVICE FOR AGRICULTURAL DIGGING MACHINES
Filed Oct. 22, 1956 3 Sheets-Sheet 1

INVENTOR
GERARD STEVENS
PER Richards & Geier
ATTORNEY

May 24, 1960 G. STEVENS 2,937,748
HAULM REMOVING DEVICE FOR AGRICULTURAL DIGGING MACHINES
Filed Oct. 22, 1956 3 Sheets-Sheet 2

INVENTOR
GERARD STEVENS
PER Richards & Geier
ATTORNEY

May 24, 1960         G. STEVENS         2,937,748
HAULM REMOVING DEVICE FOR AGRICULTURAL DIGGING MACHINES
Filed Oct. 22, 1956         3 Sheets-Sheet 3
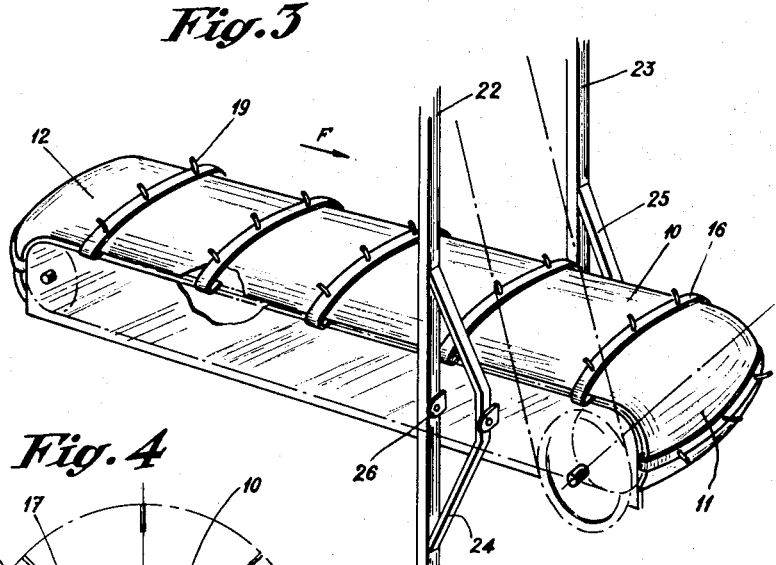
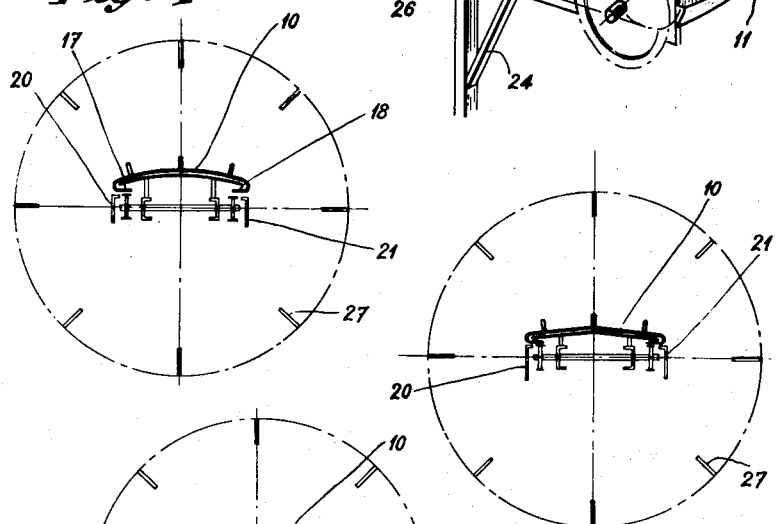
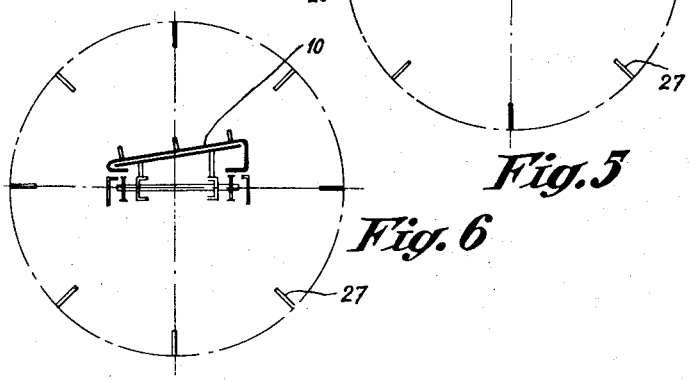
INVENTOR
GERARD STEVENS
PER Richards & Geier
ATTORNEY

United States Patent Office

2,937,748
Patented May 24, 1960

2,937,748

HAULM REMOVING DEVICE FOR AGRICULTURAL DIGGING MACHINES

Gerard Stevens, Veurnestraat 40–42, Poperinge, Belgium

Filed Oct. 22, 1956, Ser. No. 617,432

Claims priority, application Belgium Oct. 22, 1955

3 Claims. (Cl. 209—78)

This invention relates to a haulm sorting device for agricultural digging machines.

In digging machines, more specifically potato-diggers, use is generally made of an open-work drum disposed on the back part of the machine and engaged in a continuous rotational movement around its longitudinal axis. In general this drum comprises equidistantly spaced longitudinal rods, and within the drum are disposed teeth or similar projecting elements rotating with said drum. Into the drum thus arranged potatoes mixed with haulm and earth are fed. The earth will readily be separated from the potatoes and removed through the openings of the drum. The haulm is dragged along by said teeth or internal projecting parts and it is necessary to remove it from the drum in order that only clean potatoes stripped of all unwanted bodies, especially of the haulm, be admitted to the hopper.

The invention is specifically concerned with the device used for removing said haulm and other foreign bodies liable to adhere to the potatoes.

For this purpose various means have already been proposed including endless conveyor means leading to the back part of the machine; however, in general all devices hitherto proposed are affected with the same drawback, viz. that they are incapable of preventing that part of the haulm removed from returning into the drum. Certain known devices have the additional drawback, that the haulm or other foreign bodies may get entangled between the parts of the conveyor so as to form a block and to cause the conveyor to jam.

An object of the present invention is the provision of a device which is capable of ensuring systematic removal of the haulm and a neat separation of the latter from the potatoes to which they adhere. Another object is the provision of an apparatus wherein the moving elements which drag the haulm out of the drum are designed to cooperate with a fixed support having a suitable shape and cross section to ensure clean separation between the potatoes and the haulm, the latter being systematically dragged away and being prevented from returning into the drum or penetrating between such moving parts as would be braked or event blocked by such penetration.

The objects of the present invention may be realized through the provision of a haulm removing or extracting device for agricultural machines of the potato-digger type, said extracting device comprising a fixed support adequately shaped and extending throughout the length of the extracting device; said fixed support extending forwardly and backwardly into curved end parts rounding downward and back upon themselves so as to ensure permanent and positive guiding throughout the length of the haulm removing device. The moving parts substantially consist in cross bars generally spaced at equal distances and fixed to two parallel endless chain devices extending lengthwise of said support, said cross elements sliding on said support as they are positively pulled along by said endless chain devices. The cross bars carry teeth which are preferably placed at an angle or are bent back with respect to the forward movement of said moving parts. The endless elements are preferably constituted by chains located underneath the fixed support, said cross bars being bent downwards and inwards at both ends so as to join said endless chain elements to which they are connected.

The fixed support could be made with a cross section of any shape provided the latter is such as to bring about ready separation between the haulm and the potatoes, the latter being instantaneously dropped into the drum. For this purpose it is preferable to choose a curved, slanting or angular cross section for the fixed support. The cross bars may be constituted by flat or round iron bars which are curved so as to closely fit the profile of the fixed support. The teeth may simply be constituted by small stubs of adequate shape, either bare or wrapped in any suitable way capable of contributing to the correct operation of the device. The means used for driving the moving parts may also be constructed in various ways depending on the kind of machine it implements and on the kind of mover used.

In order to further illustrate the invention, a more detailed description will be given hereinafter of a particular embodiment, with reference to the accompanying drawings, in which:

Figure 3 is a perspective view of the extracting device according to the invention;

Figures 4, 5 and 6 show diagrammatically and in outline cross sectional views of three modifications of the device according to the invention.

Figure 1:
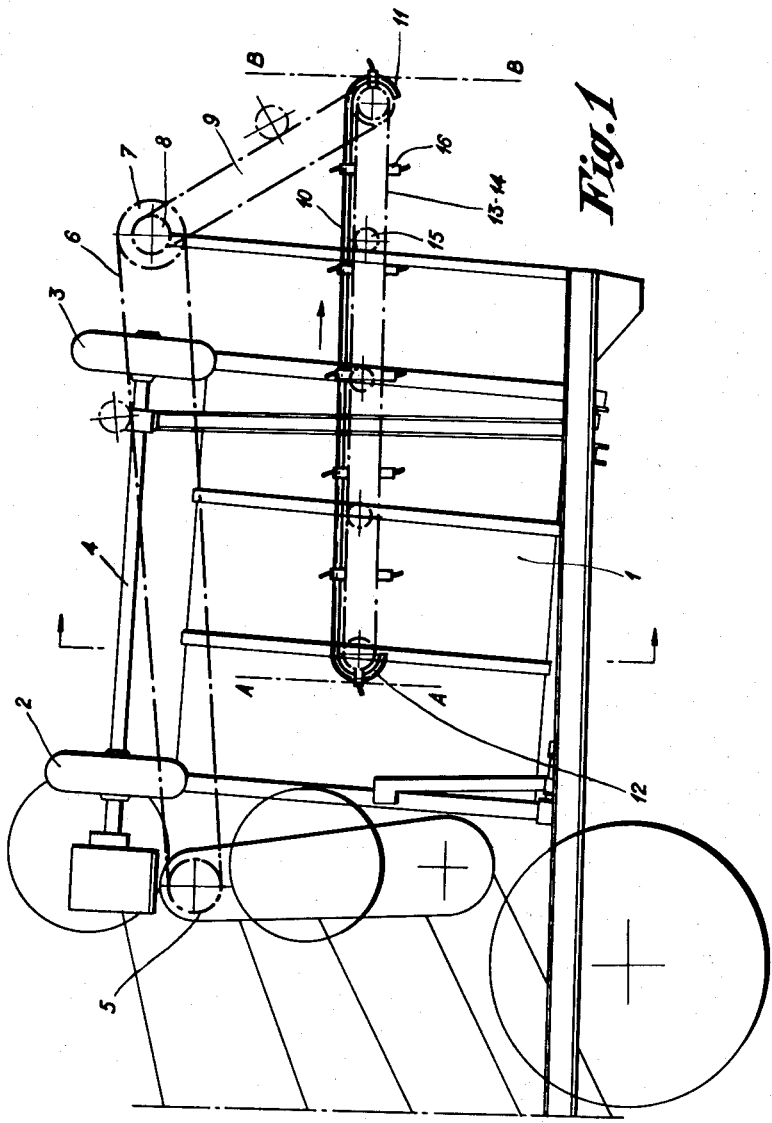
Figures 1 and 2 show diagrammatically, in side elevation and top view respectively, the essential elements of the machine, to which the object of the present invention is related.
Figure 2:
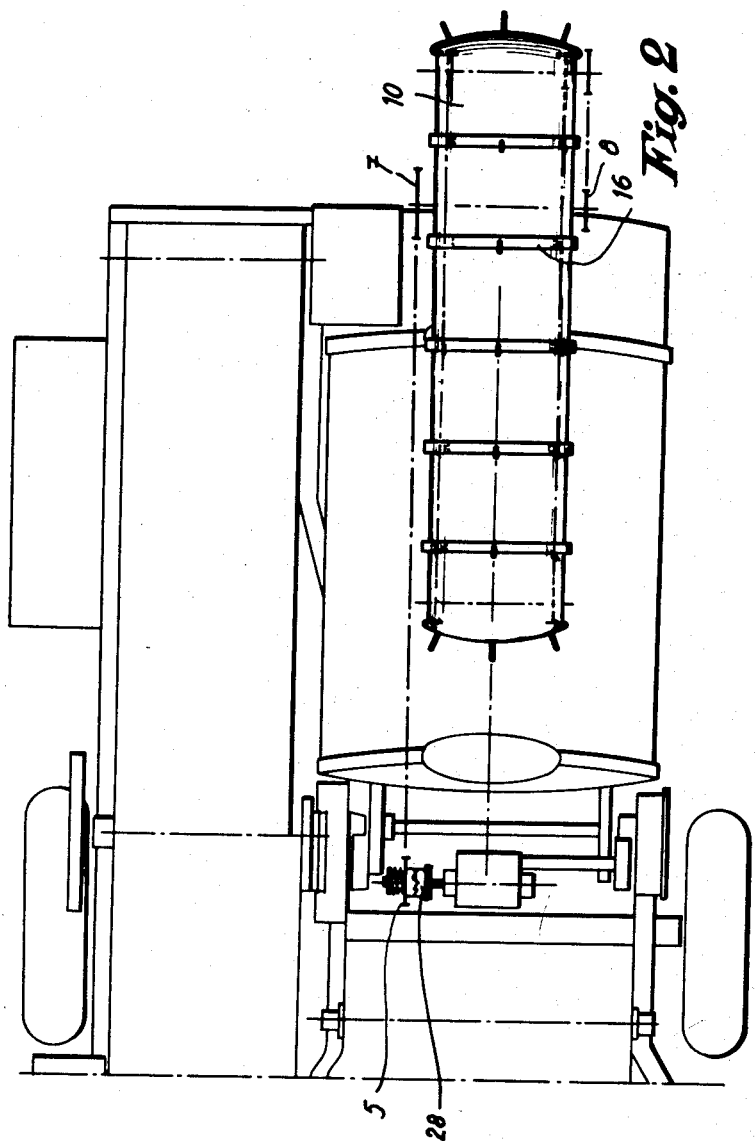

The haulm extracting device, as shown diagrammatically in Figures 1 and 2 is disposed approximatively upon the axis of the drum 1 of a known kind, which is rotated by means of friction wheels 2—3 mounted on a common shaft 4 connected with a driving mechanism of known construction. The latter also moves the driving means of the extracting apparatus which is the object of the invention, said driving means being indicated in the illustrated embodiment, by the chain wheel 5, the chain 6, the wheels 7—8 and the chain 9. The extracting device according to the invention substantially comprises a fixed guide 10 formed, for instance, of metal sheeting, transversely bulging and extending forwards and backwards into curved end portions 11—12 bending right round the edges, whereby the positive and complete guiding of the moving elements is extended beyond the vertical tangent planes A—A, B—B. The movable device comprises a pair of endless chains 13—14 supported by a series of chain wheels such as 15. Both said chains are shielded by said fixed support 10 and are interconnected by a plurality of cross elements 16, e.g. consisting of flat iron bars, which are curved to closely fit the shape of the cross section of the fixed support 10, to slide on said support when the device is in operation. Said cross elements 16 are preferably equally spaced and parallel to each other. The end parts 17—18 of said cross bars are bent downwards and inwards so as to join said endless chains 13—14 to which they are connected. Each of the cross bars 16 has a number of teeth 19 fixed thereon, three of them in the present case, standing slightly aslant and bent backwards, i.e. in the opposite direction with respect to the forward movement of the mobile elements as indicated by the arrow F. The chains are laterally protected by the shields 20—21 which may be secured on a fixed supporting structure, e.g. constituted by the uprights 22—23, brackets 24—25 and fixing lugs such as 26.

The operation of such extraction device is very simple, considering that, according to one of its features, it is horizontally or at least nearly horizontally disposed within the drum 1. As the drum is continuously rotated in the usual manner, the potatoes together with the haulm are carried along with the drum, particularly by the internal teeth or projecting elements 27. The potatoes falling on said extracting device come into contact with the fixed support 10, and due to the particular form of the latter they almost immediately fall back into the lower part of the drum 1. The haulm falling on the fixed support 10 is dragged away by the cross bars 16, whereby any possibility of said haulm being arrested or getting entangled in the constituent parts of the extracting device is excluded, so that said haulm is taken towards the backward end 11 where, again, it is made impossible for the haulm to return towards the drum or to penetrate between any parts of the mechanism.

In Figure 4 the same cross section as has been used in Figure 3 is again indicated. This cross section is convex; in Figure 5 is shown a modified form, according to which the fixed support 10 has two slopes, i.e, two slanting surfaces, and finally in Figure 6, a simplified embodiment has been shown in which the fixed support 10 consists of a single sloping plane.

It will be understood, that any other shape fulfilling the conditions of the invention may be used.

It is also to be understood, that the extracting device may be provided with any additional device or accessories of all kinds capable of ensuring or improving the efficient operation or the security of said device.

For instance, as shown diagrammatically in Figure 2, the driving mechanism of the moving elements of the device might be provided with a claw clutch 28 or any other resilient coupling means capable of automatic decoupling whenever the mechanism accidentally meets with some excessive resistance.

The invention concerns not only the extraction device itself, but also all of its constituent parts inasmuch the latter are specially designed for this purpose, and any agricultural machine comprising such extracting device.

What I claim is:

1. In an agricultural digging machine, a sorting device for separating haulm from potatoes comprising the combination of a fixed support having a continuous curved convex upper surface extending throughout the length of said device, said upper surface having the convex cross-section in a direction transverse to the length of the device and having the same curved cross section throughout its length, with a plurality of flat iron bars having the same curvature as said curved cross section of said upper surface and having a plurality of fingers fixed thereon, and driving means for sliding said flat iron bars lengthwise on said upper surface, said driving means consisting of endless chain-like devices located underneath said fixed support, each of said iron bars having both its ends bent downwards and inwards and connected each to one of said endless chain-like devices.

2. Device as claimed in claim 1, in which said fingers are fixed on said flat iron bars in a backward slanting position with respect to the forward movement of said iron bars.

3. Device as claimed in claim 1, in which said fingers fixed on said flat iron bars are bent backwards with respect to the forward movement of said iron bars.

References Cited in the file of this patent

UNITED STATES PATENTS

| 801,141 | Erickson | Oct. 3, 1905 |
| 1,356,852 | Clark | Oct. 26, 1920 |
| 1,743,240 | Ryder | Jan. 14, 1930 |
| 1,876,150 | Pearson | Sept. 6, 1932 |
| 2,717,077 | Leighton | Sept. 6, 1955 |
| 2,762,507 | Searles | Sept. 11, 1956 |
| 2,769,539 | Packman | Nov. 6, 1956 |
| 2,792,937 | Searles | May 21, 1957 |

FOREIGN PATENTS

| 768,658 | France | May 22, 1934 |
| 1,012,092 | France | Apr. 9, 1952 |
| 589,253 | Germany | Dec. 4, 1933 |